G. A. PRENTISS.
Car Axle.
No. 12,572.
Patented Mar. 20, 1855.
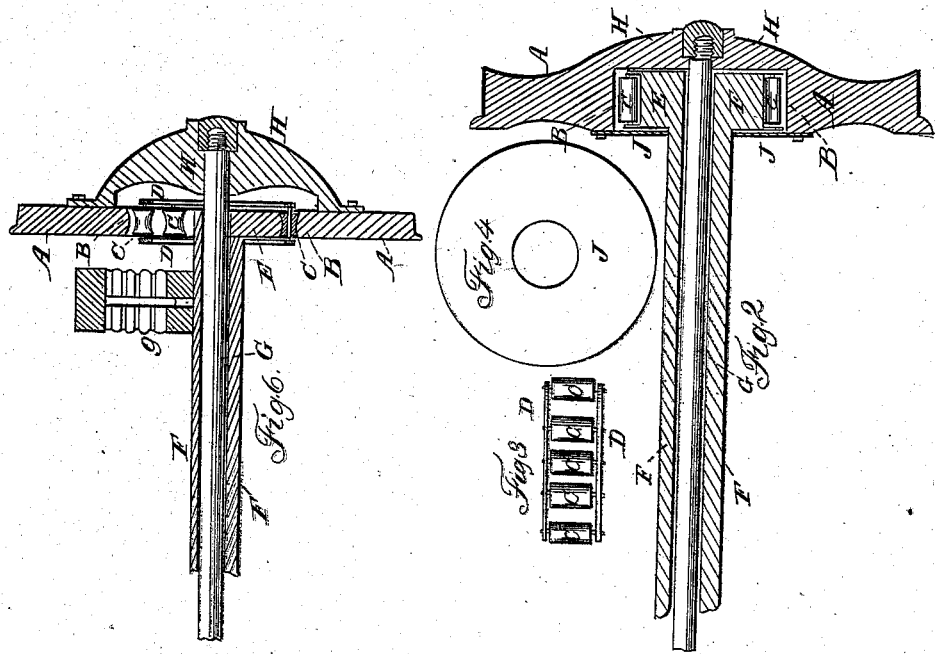
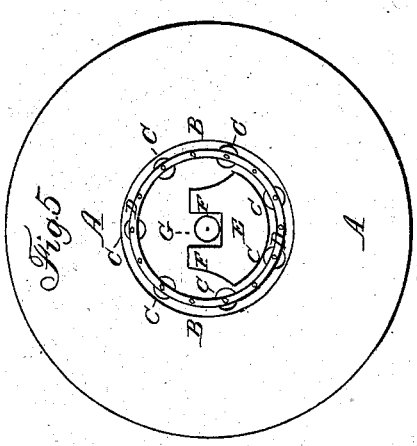
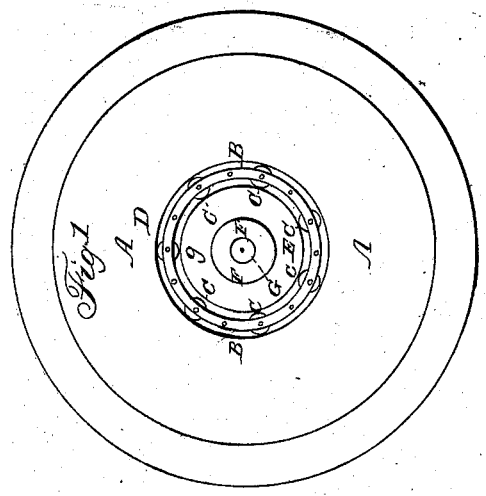

UNITED STATES PATENT OFFICE.

GEO. A. PRENTISS, OF CHESHIRE COUNTY, NEW HAMPSHIRE.

ARRANGEMENT OF WHEELS, AXLES, AND FRICTION-ROLLERS.

Specification of Letters Patent No. 12,572, dated March 20, 1855.

*To all whom it may concern:*

Be it known that I, GEORGE A. PRENTISS, of the county of Cheshire and State of New Hampshire, have invented certain new and useful Improvements in Applying Friction-Rollers to Car-Wheels and those of other Vehicles, said improvements consisting mainly in the arrangement of what I term load and securing axles in a new and useful manner; and I declare that the following specification, taken in connection with the drawings, is a full, exact, and sufficient description thereof.

In the drawings Figure 1, is a view of a wheel from the inside thereof or that side next the vehicle. Fig. 2 is a vertical section through both axles and the wheel exhibiting also the friction rollers and a cap or dust preventer. Fig. 3 is an elevation of a nest of friction rollers. Fig. 4 is an elevation of a dust preventer. Fig. 5 is a view from the inside also of a wheel exhibiting the bearer in a modified form, and Fig. 6ª is a section through the same wheel with a cap piece attached by bolts instead of being cast in one piece with the wheel as shown in Fig. 2.

The use of friction rollers in the moving of vehicles as well as in the supporting of shafts in machinery is an old and well known device, and its advantages in saving friction and thereby power are fully appreciated. Certain practical difficulties have however prevented the general practical use of these appliances except in the commonly termed patent block invented by Garnett in ordinary grind stones and in a few philosophical instruments. Many plans for introducing them into carriages have been devised but all have been lacking either in simplicity and consequently in cheapness or in practical utility if sufficiently simple as some apparatus necessary for the proper movement of the wheels of the vehicle has then been omitted.

If the ring or nest of the rollers be applied in the hub of an ordinary wheel as patent boxes usually are, the wheel by slight wear soon acquires a wabbling motion as it is expressively termed and refuses to run in a plane perpendicular to that part of the axle which passes through the wheel. The wheels then refuse to track oscillate the carriage, throw mud and dirt, destroy the roads, and in a short time require more power to revolve them than if playing on some ordinary species of axle. It will be seen therefore that the great difficulty consists in preserving the perfect parallelism of any given pair of wheels in such wise that in the first place there shall be no tendency to wear, and in the second that even when worn the contrivance shall still preserve its efficiency. This difficulty must moreover be overcome in some simple manner, and the apparatus must not take up much space. Now the object of my invention is to remedy this evil and I have contrived more than one method for effecting the purpose one of which is the subject of this present application. In my drawings I have shown it as applied to a rail road car wheel it is obvious however that any other species of wheel may be fitted in the same manner, substantially.

My invention therefore consists in the combination of a stationary load axle to which is attached a fixed bearer, a securing axle passing through the same, and a ring or nest of friction rollers, the whole applied to a pair of wheels substantially in the manner and for the purposes hereinafter described.

In order to fit a pair of wheels to any vehicle after the manner invented by me, I first cause to be bored out concentric with the wheel a cylindrical recess considerably larger than that which is required when an ordinary axle is employed, and upon the outside of this recess I locate a cap or its equivalent made in one piece with the wheel or attached thereto in any appropriate manner. This cap forms one head of the recess. In this recess I locate a nest or ring of friction rollers constructed in any usual manner preferring those in which the rollers have no axles, or where their axles have play in the ring or nest. The cylinder which would circumscribe the whole of these rollers when in position should be a little smaller in diameter than the inside of the recess, two or three rollers more or less will then be all that will touch the cylindrical part of the recess.

I now attach to the carriages or to the springs thereof a contrivance herein termed a load axle which may be a hollow cylinder or a square box, or two or more rods or any portion of a box or cylinder formed as if by cutting slots out of an entire box or cylinder. The general direction of this cylinder is that of an ordinary axle, and its imaginary axis coincides nearly with the center of any pair of wheels. Upon the ends of this axle are cast or otherwise secured two bearers, which fill or partially fill the space contained between the friction rollers contained in the nest. This bearer if cylindrical is smaller in diameter than the distance between the inner surfaces of any two opposite rollers but it may be shaped like a crescent, or in some form which will have the same effect; whatever its shape may be there must be left through it a space for the passage of a securing axle. The securing axle which may be square octagonal cylindrical, or of any other shape is now passed through the hollow of the load axle, and through the space in the bearer and is secured in the caps or their equivalents by means of a nut and washer or their equivalents, and I generally intend to fasten these axles tightly in one cap and loosely in the other drilling out a proper cylindrical hole in the cap and turning the axle so as to fit therein. By this means one wheel may if necessary move faster than the other as in passing curves.

Now by inspection of the drawings where the parts are shown in position it will be perceived, that the load rests on the load axles, is transferred by them to the bearers and then through the intervention of the friction rollers rests upon the inside of the cylindrical recess. The whole friction arising from the moving of the vehicle and consequent revolution of the wheels is therefore taken by the friction rollers. The securing axle however resting in long journals fast or loose as the case may be, ties each wheel to the other and preserves the parallelism of the planes passing through their circumference—each wheel, therefore, remains perpendicular to the load axle and all evils arising from wabbling are prevented. The load axle moreover gives ample surface which is important for the attachment of springs, and is moreover not in the way of brakes or brake gear so that the friction and consequently the amount of power required for draft are materially lessened while there is no sacrifice of convenience; but a slight addition of expense and no more tendency to wear and deteriorate than in wheels fitted with usual grease boxes or patent axles.

The same letters refer to the same parts in all the figures and in the drawings. A A represents the body of an ordinary wheel, B B the sides of the cylindrical recess formed therein or in the hub thereof if the latter be a separate piece from the spokes. C, C, represent the friction rollers and D D the rings which confine the same forming them into a nest or series. E E, are the bearers so termed attached to the load axles. F F are the load axles and G G are the securing axles concentric therewith and passing through the holes in the cap plates H H in which they are confined by nuts and washers or linch-pins or any equivalent therefor. These latter may secure the load axle immovably or in such manner that one or both wheels may if necessary revolve thereon. In addition to these parts I sometimes secure upon the inner side of the wheel a dust preventer I, I. These are disks with holes therein of sufficient size to admit of the passage of the load axle and their outer surfaces run in close contact with the inner surfaces of the bearers. India rubber or any other springs may be secured to the load axles as at J J or the vehicle may be attached directly to said axles.

As I have before stated these load axles may be hollow cylinders, or rods or their equivalents, or boxes, their form being susceptible of various modifications so long as they support the load and transfer its weight to the friction rollers while they still have room for the passage of the securing axle.

Having thus fully described my apparatus I claim therein as my own invention—

The combination substantially in the manner herein described of the following elements viz a load axle with a bearer secured thereto a securing axle concentric therewith or nearly so and a ring or series of friction rollers, the whole being applied to a pair of wheels substantially in the manner and for the purposes herein specified.

In witness whereof I have hereunto subscribed my name in presence of witnesses.

GEO. A. PRENTISS.

Witnesses:
C. F. ALVORD,
R. S. HAYWARD.